United States Patent
Lee et al.

(10) Patent No.: US 8,000,415 B2
(45) Date of Patent: Aug. 16, 2011

(54) METHOD AND DEVICE FOR DETECTING A SYNCHRONIZATION SIGNAL IN A COMMUNICATION SYSTEM

(75) Inventors: Chien-Min Lee, Taipei County (TW); Ren-Jr Chen, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 617 days.

(21) Appl. No.: 12/121,319

(22) Filed: May 15, 2008

(65) Prior Publication Data

US 2009/0147900 A1 Jun. 11, 2009

(30) Foreign Application Priority Data

Dec. 11, 2007 (TW) .............................. 96147205 A

(51) Int. Cl.
*H04L 27/06* (2006.01)
(52) U.S. Cl. ....................................................... 375/340
(58) Field of Classification Search .................. 370/203, 370/503; 375/340, 354, 362, 371
See application file for complete search history.

(56) References Cited

U.S. PATENT DOCUMENTS

| | | | |
|---|---|---|---|
| 6,614,864 B1* | 9/2003 | Raphaeli et al. | ............... 375/371 |
| 7,012,881 B2 | 3/2006 | Kim | |
| 7,039,000 B2 | 5/2006 | You et al. | |
| 7,136,438 B2 | 11/2006 | Doi | |
| 7,177,376 B2 | 2/2007 | Atungsiri et al. | |
| 7,218,691 B1 | 5/2007 | Narasimhan | |
| 2005/0117674 A1 | 6/2005 | Jeon et al. | ...................... 375/342 |
| 2006/0018413 A1 | 1/2006 | Gupta | |
| 2006/0146962 A1* | 7/2006 | Troya et al. | ................... 375/340 |
| 2007/0153761 A1* | 7/2007 | Fechtel | .......................... 370/350 |
| 2009/0135977 A1* | 5/2009 | Sheu | ............................ 375/371 |

FOREIGN PATENT DOCUMENTS

| | | |
|---|---|---|
| TW | I252656 | 4/2006 |
| TW | 200623699 | 7/2006 |

OTHER PUBLICATIONS

Chinese Examination Report of Taiwan Application No. 096147205, dated on May 27, 2011.

* cited by examiner

*Primary Examiner* — David C Payne
*Assistant Examiner* — Leon-Viet Q Nguyen
(74) *Attorney, Agent, or Firm* — J.C. Patents

(57) ABSTRACT

A method and a device for detecting a synchronization signal with a high identification rate are provided, which are suitable for a wide-area Orthogonal Frequency Division Multiplexing (OFDM) system. The method and device can precisely detect information of a synchronization signal, without being interfered by transmission channels and noises in an external environment. Three sliding windows are used to obtaining a balance value as an offset value for the output signal of the method and the device. A peak position of the output signal is identified and then compensated for a delay caused by the length of one of the sliding windows. Such a position is an edge of the synchronization signal.

12 Claims, 10 Drawing Sheets

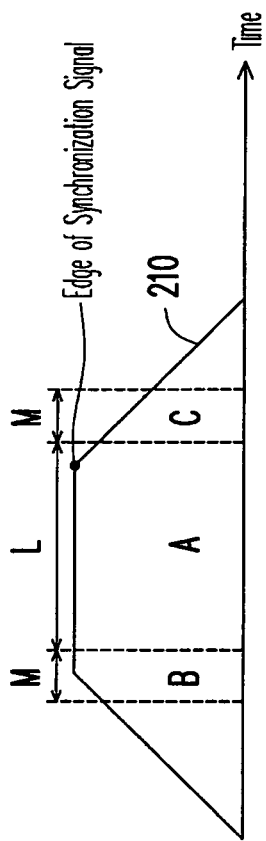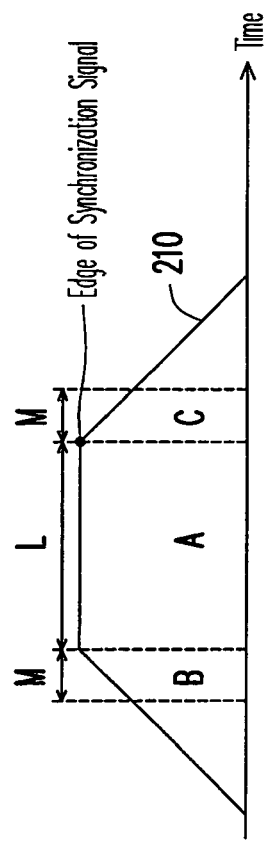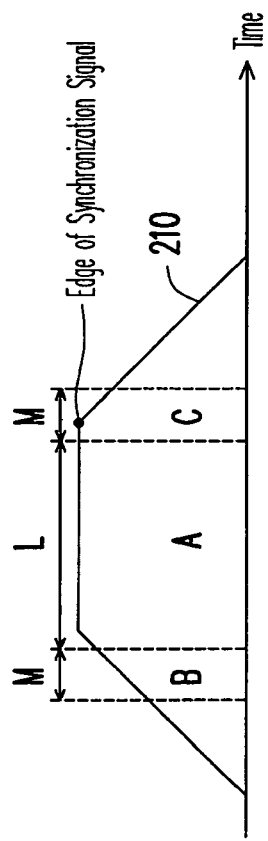

METHOD AND DEVICE FOR DETECTING A SYNCHRONIZATION SIGNAL IN A COMMUNICATION SYSTEM

CROSS-REFERENCE TO RELATED APPLICATION

This application claims the priority benefit of Taiwan application serial no. 96147205, filed on Dec. 11, 2007. The entirety of the above-mentioned patent application is hereby incorporated by reference herein and made a part of specification.

BACKGROUND OF THE INVENTION

1. Field of the Invention

The present invention relates to a method for detecting a synchronization signal.

2. Description of Related Art

In 1960, Orthogonal Frequency Division Multiplexing (briefly referred to as OFDM) technology using parallel data transmission and frequency division multiplexing concept has been proposed. The study about the OFDM technology mainly focuses on providing the modulation and demodulation technologies for high-speed transmission and applying to digital mobile communication systems. Inter-symbol Interference (ISI) and Inter-carrier Interference (ICI) often occur due to the errors in channel pulse response, timing synchronization, and frequency synchronization.

Therefore, in the OFDM system, one of the important tasks is timing synchronization and estimation, especially for a receiving end. Conventionally, a synchronization signal is formed by transmitting a specific signal repeatedly. The estimation is generally performed by adopting an auto-correlator, which provides a well-known and simple timing estimation method. The device may detect the timing-relevant characteristics of any signal with repeating characteristics. The timing information may be detected through using this device. However, if the synchronization signal is repeated in timing sequence for over twice, the computation result obtained by the device may generate a so-called plateau region, and the plateau region is usually generated at a symbol edge of the synchronization signal, which is caused by a cyclic prefix (CP) added to the front end of the OFDM symbol, or caused by the synchronization signal formed by a signal that is transmitted over twice. The plateau region may lead to inaccuracy in timing estimation.

From the aspect of the conventional system, for example, IEEE 802.11(a), the plateau region seems to cause no great influences, and a high peak region may be used to perform the timing synchronization estimation. The information about the timing may be further obtained simply through adding a specific detection criterion to the design. However, the aforementioned method has a precondition, i.e., the communication environment must be in a stable state, and noises or channel effect must be as low as possible, so that the obtained result of the plateau characteristic may be clear and expectable. Only in this manner, the aforementioned detection method can produce a correct result.

However, as for the next-generation communication system, the OFDM system may be more widely applied in, for example, outdoor communication systems or communication architectures that must support high mobility. Under this circumstance, the timing detection result is influenced by the noises from the external environment, and as a result, a plateau signal becomes fuzzy. In this way, timing-relevant information cannot be detected correctly, and thus the conventional detection architecture is not suitable for the next-generation communication system.

In U.S. Pat. No. 7,012,881 published on Mar. 14, 2006, entitled "Timing and Frequency offset Estimation Scheme for OFDM Systems by using an Analytic Tone", as for the timing synchronization, all auto-correlation results outputted from the auto-correlator are summed up by using a sliding window, so as to avoid the plateau phenomenon.

In US Patent Application No. 200600018143 published on Jan. 26, 2006, entitled "Coarse Timing Estimation System and Methodology for Wireless Symbols", the synchronization signal is a common OFDM symbol, and the timing information may be estimated by using cyclic prefix (CP). Such synchronization signal may not cause the so-called plateau effect. Furthermore, since the length of the cyclic prefix is relatively short, if the communication environment is extremely awful, the peak generated by auto-correlation may be easily submerged by the channel environment or noises.

In U.S. Pat. No. 7,218,691 published on May 15, 2007, entitled "Method and Apparatus for Estimation of Orthogonal Frequency Division Multiplexing Symbol Timing and Carrier Frequency Offset", a low-pass filter is added to an auto-correlation output of the auto-correlator, so that a plateau curve gradually becomes smooth. The timing is finished by a detection procedure, and the detection condition is based upon the position of the plateau region.

In U.S. Pat. No. 7,039,000 published on May 2, 2006, entitled "Timing Synchronization for OFDM-Based Wireless Network", a two-stage auto-correlation circuit is used to obtain desirable timing information. In the first stage, an auto-correlator of coarse timing synchronization is used, and in the second stage, an auto-correlator of fine timing synchronization is used. In the fine timing synchronization, an up-sampler and an interpolator are used to enhance the accuracy of the detection.

In U.S. Pat. No. 7,039,000 published on May 2, 2006, entitled "Apparatus and Associated Method of Symbol Timing Recovery Using Coarse and Fine Symbol Time Acquisition", a profile of the channel impulse response is estimated in a time domain, so as to estimate the timing information. In the method provided by the patent, in order to obtain the channel pulse response, a pilot signal in a frequency domain must be known in advance. The detection method needs to use Fast Fourier Transformation (FFT) and Inverse Fast Fourier Transformation (IFFT) computations, which is generally suitable for the timing adjustment after a receiving end has finished coarse synchronization.

In U.S. Pat. No. 7,136,438 published on Nov. 14, 2006, entitled "Receiving method and Receiver", the maximum likelihood concept is used to perform match detection on the received signal and the known synchronization signal.

In US Patent No. 20060146962 published on Jul. 6, 2006, entitled "Method and Device for Frame Detection and Synchronizer", a differentiator is used to detect the edge of the plateau.

SUMMARY OF THE INVENTION

The present invention provides a method for detecting a synchronization signal in a communication system. A signal containing a synchronization signal is received by a receiving end, and input signals are generated after performing an auto-correlation computation on the received signal. The generated input values are output to a synchronization signal detection device that includes three sliding windows. A first sliding window value, a second sliding window value, and a third sliding window value corresponding to the input signals are obtained therefrom. The length of the second sliding window is larger than that of the first sliding window and that of the third sliding window. An output value of the second sliding window is obtained by summing up the signals in this window. As for the first sliding window and the third sliding window, the signals in each window are respectively summed up, and a difference there-between is calculated. The difference is subtracted from the output value of the second sliding window to get an output signal of an identification device. Then, a peak position of the output signal is identified, and then compensated for a delay caused by a length of the third sliding window, and this position is a symbol edge of the synchronization signal. The compensated length thereof is the length of the third window.

The present invention provides a device for detecting a synchronization signal in a communication system, an exemplary example of the above-mentioned communication system consistent with the invention includes an auto-correlation generator, a plurality of registers, and a plurality of adders. The auto-correlation generator receives a signal containing a synchronization signal, and sequentially generates a plurality of input signals after performing an auto-correlation computation upon the received signal. The registers are serially connected for receiving the input signals generated by the auto-correlation generator, and sequentially storing the input signals by means of shifting. The adders respectively obtain a first number, a second number, and a third number of input signal values stored in the serially-connected registers from an end of the registers where the input signals are received, and then sum them up to obtain a first window value, a second window value, and a third window value. The first number, the second number, and the third number are the number of the registers corresponding respectively thereto. The second number is larger than the first number and also larger than the third number, and it determines whether the synchronization signal appears or not according to the second window value. If the synchronization signal appears, a peak appeared in the second window. A balance value is obtained from an absolute value of the difference between the first window value and the third window value, and the balance value is subtracted from the second window value to get the output of the synchronization signal detection device. A peak position of the output signal is identified, and then the peak position is compensated for a delay caused by the length of the third sliding window, and this position is a symbol edge of the synchronization signal. The compensated length is the length of the third window.

In the aforementioned method and device, a length of the second window is a length of a plateau generated by the synchronization signal after performing the auto-correlation computation.

BRIEF DESCRIPTION OF THE DRAWINGS

The accompanying drawings are included to provide a further understanding of the invention, and are incorporated in and constitute a part of this specification. The drawings illustrate exemplary embodiments consistent with the invention and, together with the description, serve to explain the principles of the invention.

FIG. 3B is a schematic view of a plateau signal obtained from the synchronization signal through the auto-correlator, when it has partially passed through the circuit shown in FIG. 3A.

FIG. 3C is a schematic view of the plateau signal obtained from the synchronization signal through the auto-correlator, when it has completely entered the circuit shown in FIG. 3A.

FIG. 3D is a schematic view of the plateau signal obtained from the synchronization signal through the auto-correlator, when it has not completely entered the circuit shown in FIG. 3A yet.

DESCRIPTION OF THE EMBODIMENTS

Figure 1A:
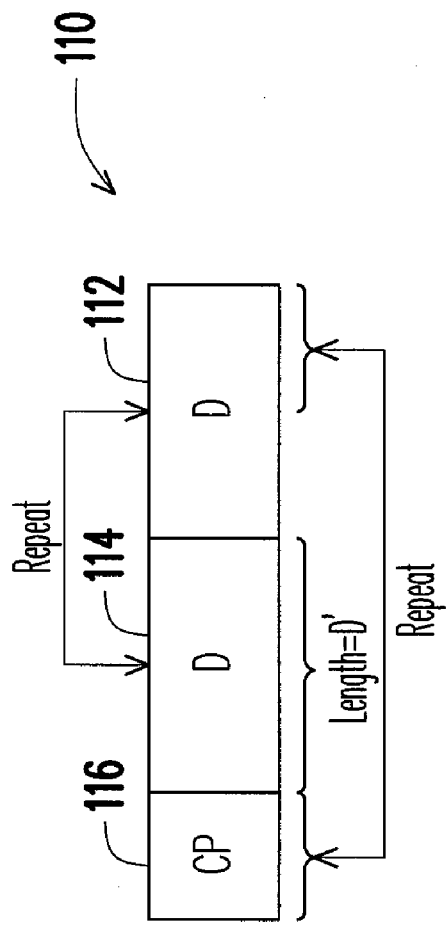
FIG. 1A shows a standard structure of a synchronization signal in an OFDM symbol signal.

Reference will now be made in detail to the present embodiments of the invention, examples of which are illustrated in the accompanying drawings. Wherever possible, the same reference numbers are used in the drawings and the description to refer to the same or like parts.

According to an exemplary embodiment consistent with the present invention, a method and a device for detecting a synchronization signal with a high identification rate are provided, which are suitable for a wide-area OFDM system. Such method and device can detect the synchronous information correctly, without being interfered by noises in an external environment.

According to an exemplary embodiment consistent with the present invention, a method and a device for detecting a synchronization signal with a high identification rate are provided, which are suitable for a wide-area OFDM system. Such method and device can detect the synchronous information correctly, without being interfered by noises in an external environment. The method for detecting a synchronization signal includes the following steps: receiving a received signal containing a synchronization signal, and generating a plurality of input signals after performing an auto-correlation computation; sequentially obtaining a plurality of window values corresponding to the input signals according to a plurality of windows; determining whether a peak signal is generated or not in the synchronization signal according to one of the obtained window value, obtaining a balance value of the other window values, and subtracting the balance value from the peak signal to get an output of the synchronization signal detection device; identifying a peak position of the output signal, and compensating the peak position for a delay caused by a length of the third window. Such a position is a symbol edge of the synchronization signal. The compensated length is the length of the third window.

In the method for detecting a synchronization signal, the obtained window length of the peak signal is a plateau length generated by the synchronization signal after passing through the auto-correlator.

In the method for detecting a synchronization signal, the plurality of window values corresponding to the input signals are respectively obtained by summing up the corresponding values of the input signals.

The method for detecting a synchronization signal is applicable for wireless local area network (WLAN), worldwide interoperability for microwave access (WiMAX), wideband code division multiple access (WCDMA), and so on.

Figure 1B:
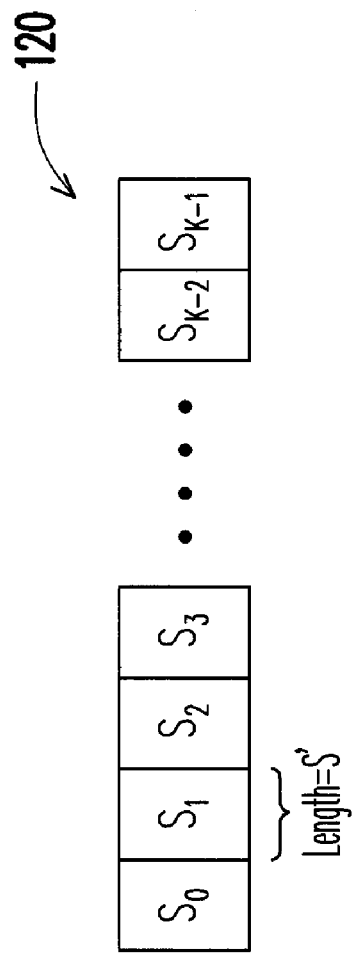
FIG. 1B is a schematic structural view of a signal provided according to the standard IEEE 802.11(a).

Firstly, the method for detecting a synchronization signal provided by the present invention is directed to a group of repeated synchronization signals similarly used in time detection. Referring to FIG. 1A, it shows a standard structure of a synchronization signal in an OFDM symbol signal. The synchronization signal 110 of the OFDM symbol includes two symmetric and repeated signal portions 112 and 114 (the portions "D" shown in the figure), and further includes a cyclic prefix portion 116 (the portion "CP" shown in the figure). The length of the signal portion "D" is D', and the portion CP is located at the front end of the OFDM symbol 110. FIG. 1B shows a OFDM signal structure in time domain, which includes a plurality of short training symbols "S", totally K synchronization signals, including signals $S_0$, $S_1$, ..., to $S_{K-1}$ as shown in the figure.

FIG. 1A shows a synchronization signal structure of the OFDM symbol, which includes a signal portion (i.e., the two portions "D") and a cyclic prefix portion "CP". The process for generating a synchronization signal adopts a down-sample of frequency domain signals, so that the time domain signals are repeated.

Figure 1C:
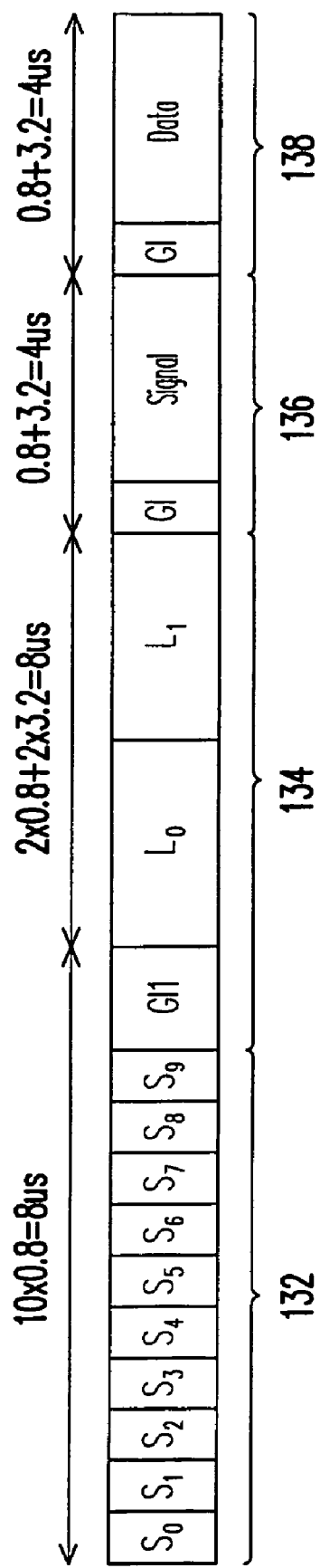
FIG. 1C is a schematic structural view of a whole data packet, including ten short training symbols, two long training symbols, one signal field, and a data field.

The signal structure provided in FIG. 1B has already been defined in the standard IEEE 802.11(a), the time domain signals 120 as shown in FIG. 1B, includes totally K short training symbols $S_0$ to $S_{K-1}$, and the length of each short training symbol is S'. For example, if K=10 is taken as an example, the whole data packet, as shown in FIG. 1C, includes ten shorting training symbols 132 ($S_0$ to $S_9$ shown in FIG. 1C), two long training symbols 134 ($L_0$ and $L_1$ shown in FIG. 1C), a signal field 136, and a data field 138.

Figure 2A:
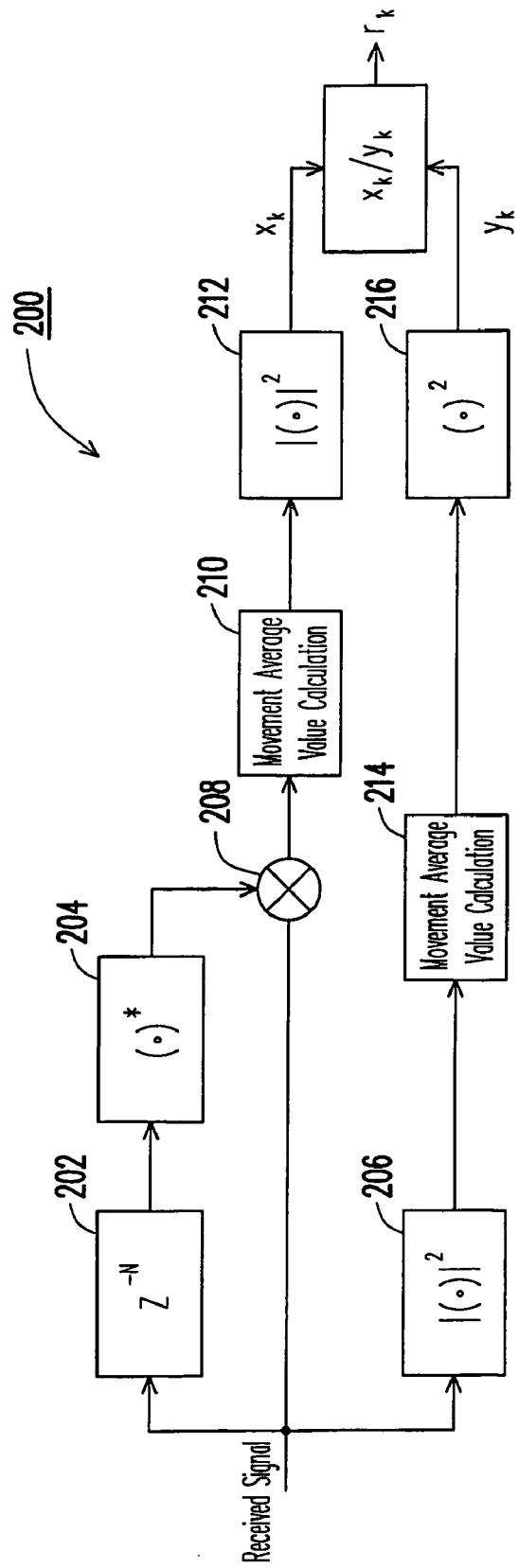
FIG. 2A is a schematic block diagram of a circuit of an auto-correlator.

Referring to FIG. 2A, it is a schematic block diagram of a circuit of an auto-correlator. In the auto-correlator 200, N may be the length D' of the signal portions 112 and 114 in FIG. 1A, or may be the length S' of each short training symbol in FIG. 1B. The received signal is performed with two parallel computations. One computation is that the received signal passes through a delay device 202 for delaying N clocks and a circuit 204 for calculating a conjugate complex, to get an output value; then, the output value is multiplied by the received signal through using a multiplier 208, to output the result to a movement average value calculation device 210; then after being calculated, the result is output to a circuit 212 for calculating an absolute value, so as to finally output $\chi_k$. In addition, the other computation is to firstly calculate an absolute value of the received signal, and then the absolute value is calculated by the movement average value calculation device 214, then the result is output to the circuit 216, so as to finally output $y_k$. Therefore, the output of the auto-correlator 200 may be $r_k = \chi_k / y_k$.

Figure 2B:
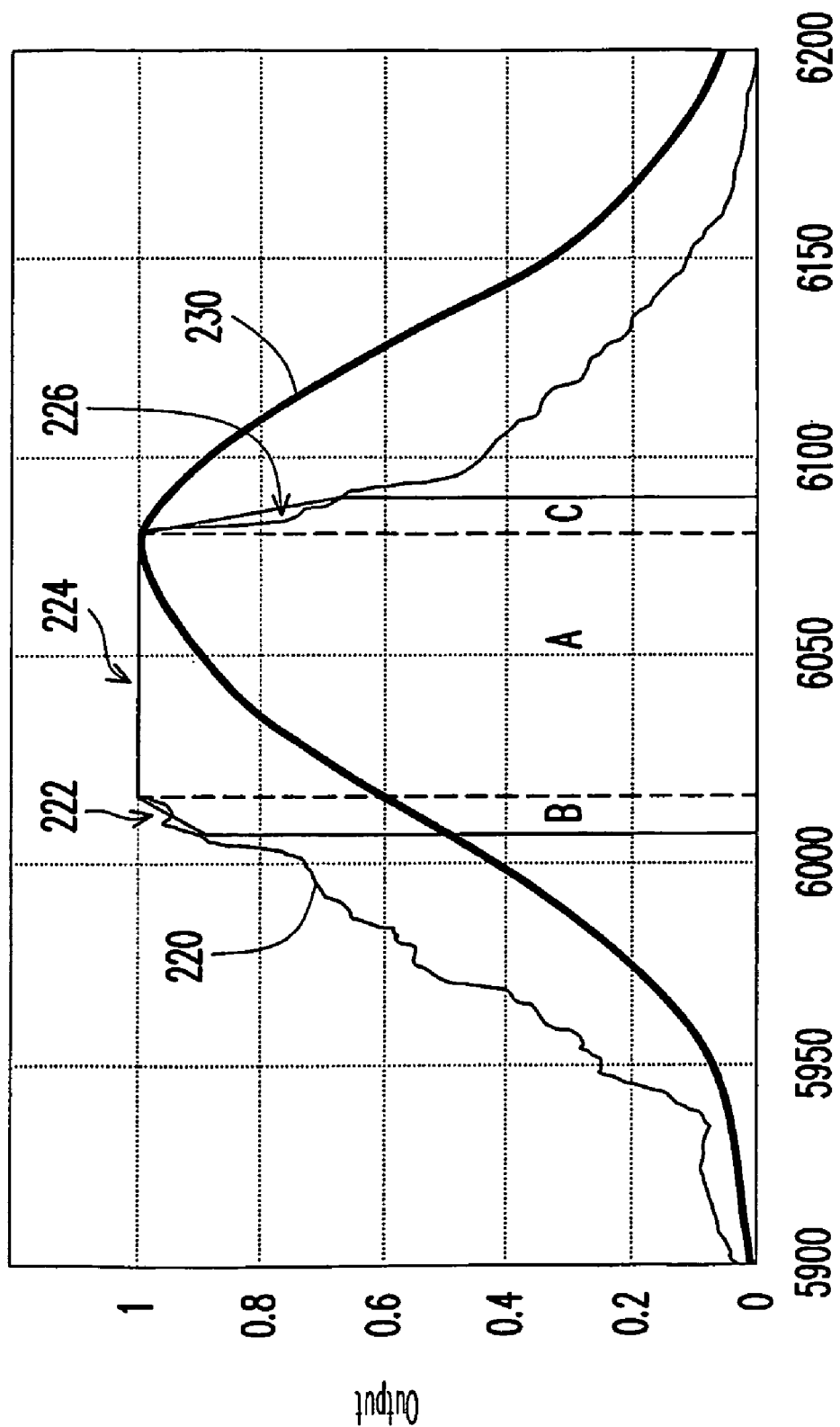
FIG. 2B further shows an output of the auto-correlator when receives the signal in FIG. 1A with respect to the corresponding time region.

The auto-correlator 200 detects the synchronization signal obtained in FIG. 1A to get a graph about the output timing and the calculation results, as shown by the Curve 220 in FIG. 2B. It can be clearly known from the result that, a plateau region 224 is generated when the auto-correlator 200 is used to detect the synchronization signal in FIG. 1A. The output and the corresponding time regions when a plateau phenomenon occurs for the auto-correlator 200 in detecting the synchronization signal in FIG. 1A are depicted in the figure, which is shown by a trapezoid-shaped graph, including the Regions A, B (marked with 222), and C (marked with 226). The length of Region A is the length of the plateau region 224, and Region B and Region C are respectively located at two sides of Region A.

Figure 2C:
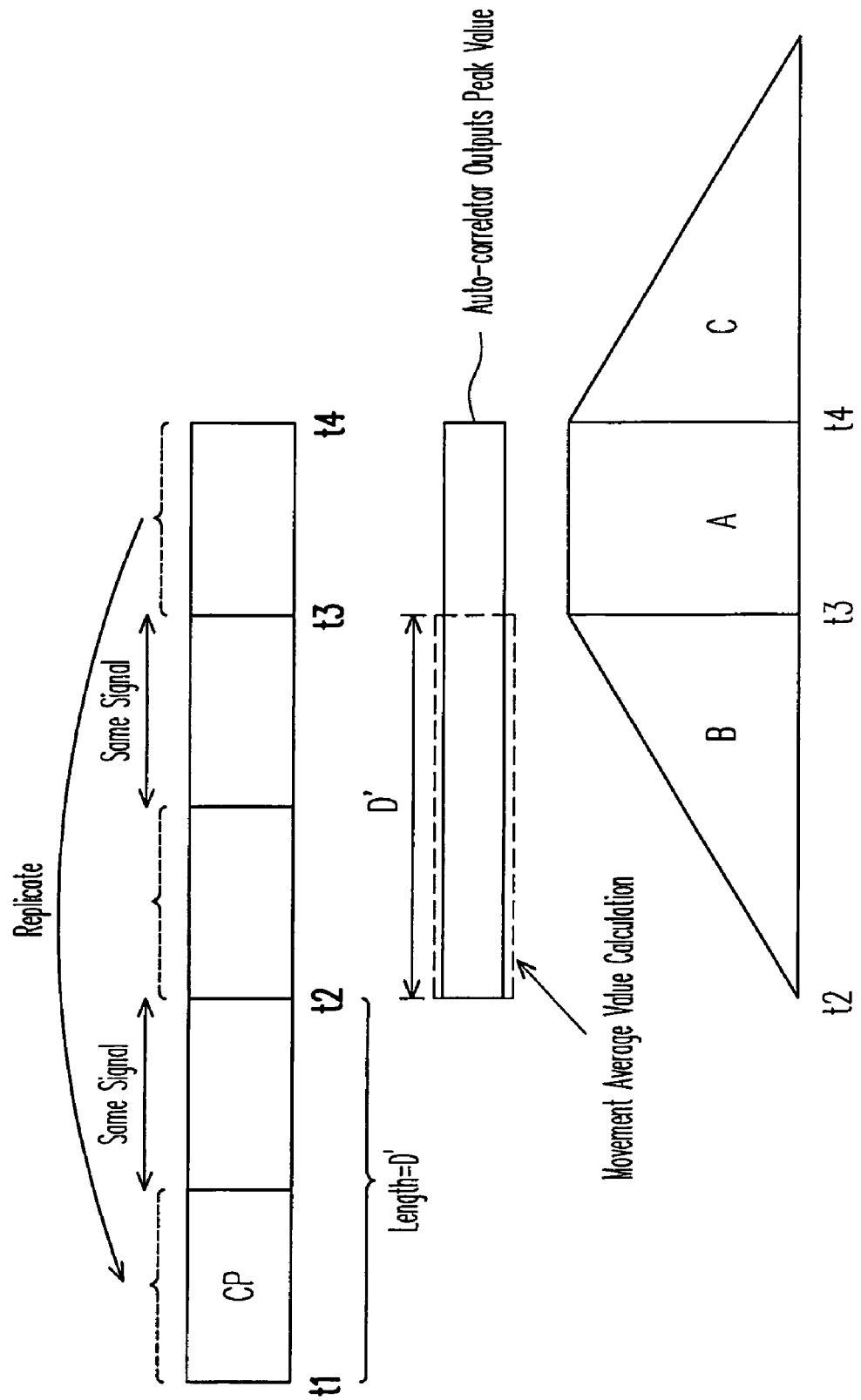
FIG. 2C is a schematic view of generating a plateau region by outputs of the auto-correlator.

The generation of the plateau region can be obtained with reference to FIG. 2C. For example, the structure of the synchronization signal for the OFDM symbol in FIG. 1A includes a signal portion (the two portions "D") and a cyclic prefix portion (the portion "CP"). After passing through the auto-correlator, the synchronization signal begins to generate a peak at a time point t2 due to detecting the repeated signal. The peak generated by the auto-correlator is continuously maintained until the synchronization signal is ended at a time point t4. A sliding window is used, and the average values (such as 210 in FIG. 2A) in the corresponding window are summed up. Provided that the movement average value is calculated from t1, Region B begins to be formed at t2; then at t3, it enters the plateau region, thereby gradually forming Region A; and then at t4, the movement average value begins to drop to form Region C. According to the results generated by the auto-correlator 200 as the timing sequence, it can be known that the length of Region A, i.e., the plateau region 224, equals to the length of the CP signal+1.

The method for detecting a synchronization signal with a high identification rate according to an exemplary embodiment consistent with the present invention can eliminate the plateau region generated when the auto-correlator detects the synchronization signal, thereby obtaining correct detection results. In order to describe the features of the present invention conveniently, the outputs generated when the auto-correlator 200 is used to detect the synchronization signal and the corresponding time regions will be further described with reference to FIGS. 3B-3D, and the trapezoid-shaped graph includes Region A in the middle and Region B and Region C at each side thereof. The length of Region A is the length of the plateau region 224, and Region B and Region C are located at each side of Region A. The values of these regions may be obtained through different sliding windows, and the sum of the values may be further obtained through the different sliding windows. The method for detecting a synchronization signal with a high identification rate provided by the present invention can obtain the correct time point for the peak simply through performing combined computations on the output values of different sliding windows and meanwhile determining the position where the peak is generated.

As shown by Curve 230 in FIG. 2B, if merely one sliding window is used to calculate the output A' to eliminate the plateau signal, the peak region is smooth, and not sufficiently obvious, which may easily become even fuzzy due to the channel environments or noises. If the outputs of the sliding windows are utilized, and the relation A'−|C'−B'| is further used, the plateau region may be efficiently removed. A' indicates the sum of the signals in Region A, and B' and C' respectively indicate the sums of Region B and Region C. After the total output of the sliding windows is integrated into A'−|C'−B'|, the obtained results are shown by Curve 410 in FIG. 4. It can be known from the figure that, after the total output of the sliding windows is set as A'−|C'−B'|, the plateau region phenomenon is removed from the figure about the results.

Figure 3A:
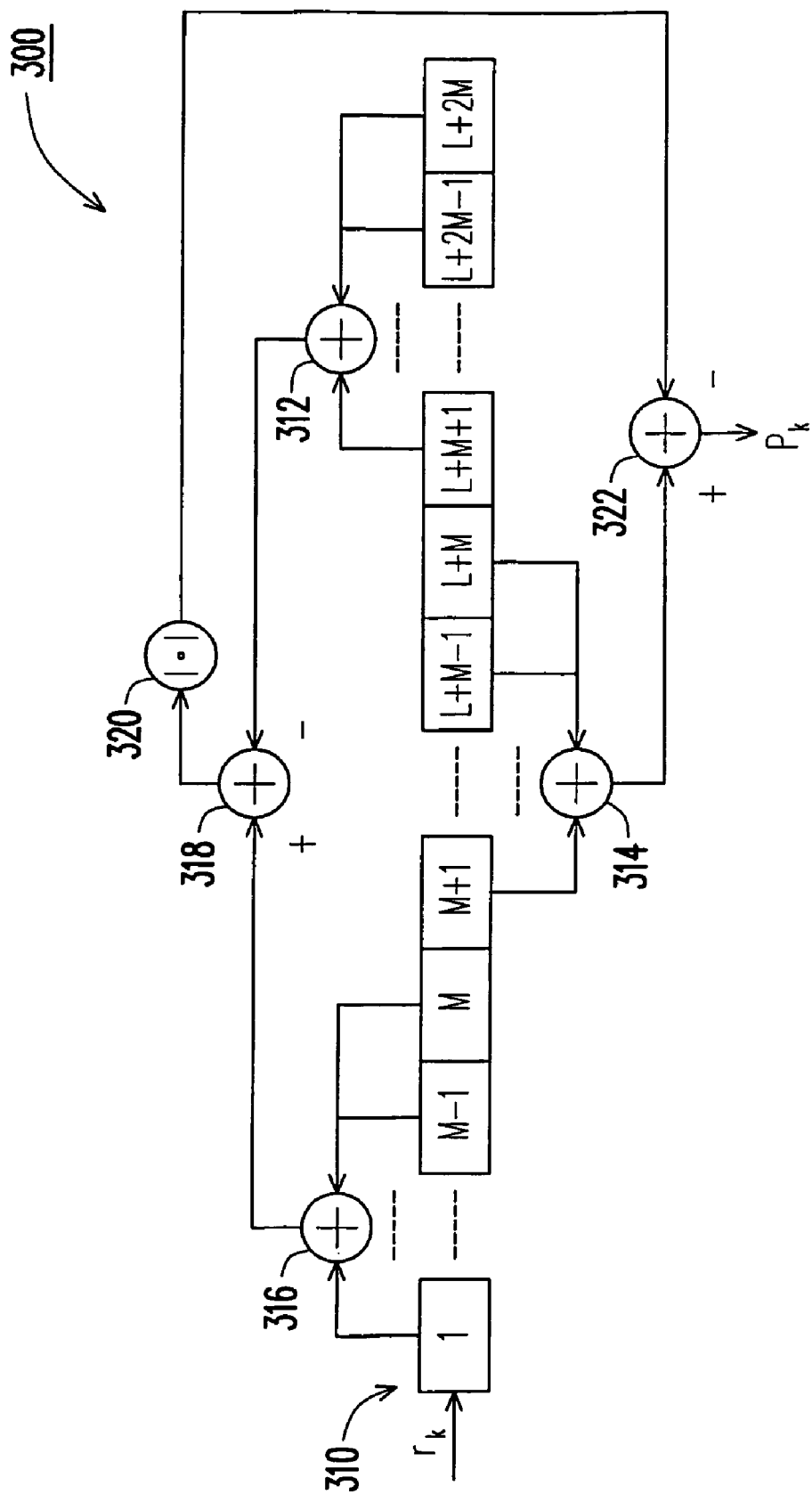
FIG. 3A is a schematic circuit diagram of a method for detecting a synchronization signal with a high identification rate according to an exemplary embodiment consistent with the present invention.

The circuit diagram when the method for detecting a synchronization signal with a high identification rate provided according to an exemplary embodiment consistent with the present invention is practically applied is shown in FIGS. 3A-3D, so as to obtain a suitable width of a sliding window. In FIG. 3A, the outputs $r_k=\chi_k/y_k$ of the auto-correlator 200 are transmitted to the registers of the circuit 300 in a time sequence. The circuit 300 requires (L+2M) serially-connected registers 310, in which L indicates the length of the sliding window $\hat{A}$ in Region A, and M indicates the lengths of the sliding windows $\hat{B}$ and $\hat{C}$ of Region B and Region C. Herein, provided that the length of Regions B is the same as that of Region C, the marks with "^" above the letters are mainly used to indicate the names of the sliding windows. Therefore, the value B' of the sliding window $\hat{B}$ may be obtained by adding the values stored in the $(L+M+1)^{th}$–$(L+2M)^{th}$ registers in an adder 312, the value A' of the sliding window $\hat{A}$ may be obtained by adding the values stored in the $(M+1)^{th}$–$(L+M)^{th}$ registers in an adder 314, and the value C' of the sliding window $\hat{C}$ may be obtained by adding the values stored in the $1^{st}$-$M^{th}$ registers in an adder 316.

The values B' and C' are performed with a computation of C'–B'(C' is input into a positive end of the adder 318, and B' is input into a negative end of the adder 318) through an adder 318, and then the result is processed by the circuit 320 to get an absolute value thereof, and then, the absolute value is input to an adder 322, so as to calculate an output value of A'–|C'–B'|. The output value may be used to determine whether the circuit 300 generates a peak or not due to detecting the synchronization signal. Therefore, the signal input and output relation of the circuit 300 may be expressed in the following equations:

$$P_k = \sum_{k_1=M}^{L+M-1} r_{k-k_1} - \left| \sum_{k_2=0}^{M-1} r_{k-k_2} - \sum_{k_3=L+M}^{L+2M-1} r_{k-k_3} \right|, \text{ in which,}$$

$$\sum_{k_1=M}^{L+M-1} r_{k-k_1} = A', \sum_{k_2=0}^{M-1} r_{k-k_2} = C', \text{ and } \sum_{k_3=L+M}^{L+2M-1} r_{k-k_3} = B'.$$

As described above, the method for detecting a synchronization signal with a high identification rate provided by the present invention includes the following steps. Firstly, a receiving end receives a signal containing a synchronization signal, and generates input signals after an auto-correlation computation is performed on the received signal, and the input signals are output to the synchronization signal detection device that includes three sliding windows. Then, a first sliding window value, a second sliding window value, and a third sliding window value corresponding to the input signals are obtained correspondingly. The lengths of these sliding windows are, in the exemplary embodiment, the number of the registers respectively within the ranges of the sliding windows. The length of second sliding window is larger than the lengths of first and the third sliding windows. The output value of the second sliding window is obtained by summing up the signals in the window. As for the first and third sliding windows, the signals in the windows are respectively summed up, and then a difference there-between is calculated. Subsequently, the difference is subtracted from the output value of the second sliding window, so as to get an output signal of the identification device. The peak position of the output signal is identified, and then compensated for the delay caused by the length of the third sliding window. The position is a symbol edge of the synchronization signal.

The first sliding window value, the second sliding window value, and the third sliding window value are the output values of the adders 316, 314, and 312 shown in the figures.

The difference calculated between the first and third sliding windows is the output of the adder 318. Then, the difference is subtracted from the output value of the second sliding window, thereby obtaining the output of the adder 322.

The principle of the circuit 300 mainly lies in utilizing a sliding windows $\hat{A}$ with a length L to obtain a sum of the plateau signal (i.e., the area of the Region A in FIGS. 3B-3D) generated after the synchronization signal received by the receiving end passes through an auto-correlation detector. Furthermore, the sliding windows ($\hat{B}$ and $\hat{C}$) with a length M are respectively added to the front and back ends of the sliding window $\hat{A}$, thereby obtaining the sums of the signals in the slopes (Region B and Region C in FIGS. 3B-3D) at two sides of the plateau region generated after the synchronization signal received by the receiving end passes through theauto-correlation detector. When the plateau region obtained after the synchronization signal is performed with the auto-correlation computation completely enter the sliding window $\hat{A}$ in the circuit 300 (FIG. 3C), the output A' of the sum of the sliding window should generate a peak, and meanwhile, the output values (B' and C') of the sliding windows ($\hat{B}$ and $\hat{C}$) at the two sides should be quite similar to each other (|C'−B'|≅0).

If the plateau region generated after the synchronization signal is performed with the auto-correlation computation leaves or does not completely enter the L registers in the circuit 300 (FIG. 3B or FIG. 3D), the output value (A') of the sliding window $\hat{A}$ will be reduced, and meanwhile, the difference (|C'−B'|>0) between the output values (B' and C') of the two sliding windows ($\hat{B}$ and $\hat{C}$) at the two sides will be increased. Therefore, the peak of the plateau signal can be detected through the output signal of A'−|C'−B'| obtained through three sliding windows, and the identification ability of the receiving end is enhanced through the balance relation (|C'−B'|) between B' and C'. In this way, the method provided in this embodiment may efficiently estimate the position of the symbol of the synchronization signal. Furthermore, the anti-interference function may be achieved through performing the estimation according to the concept of the summing up signals.

Figure 4:
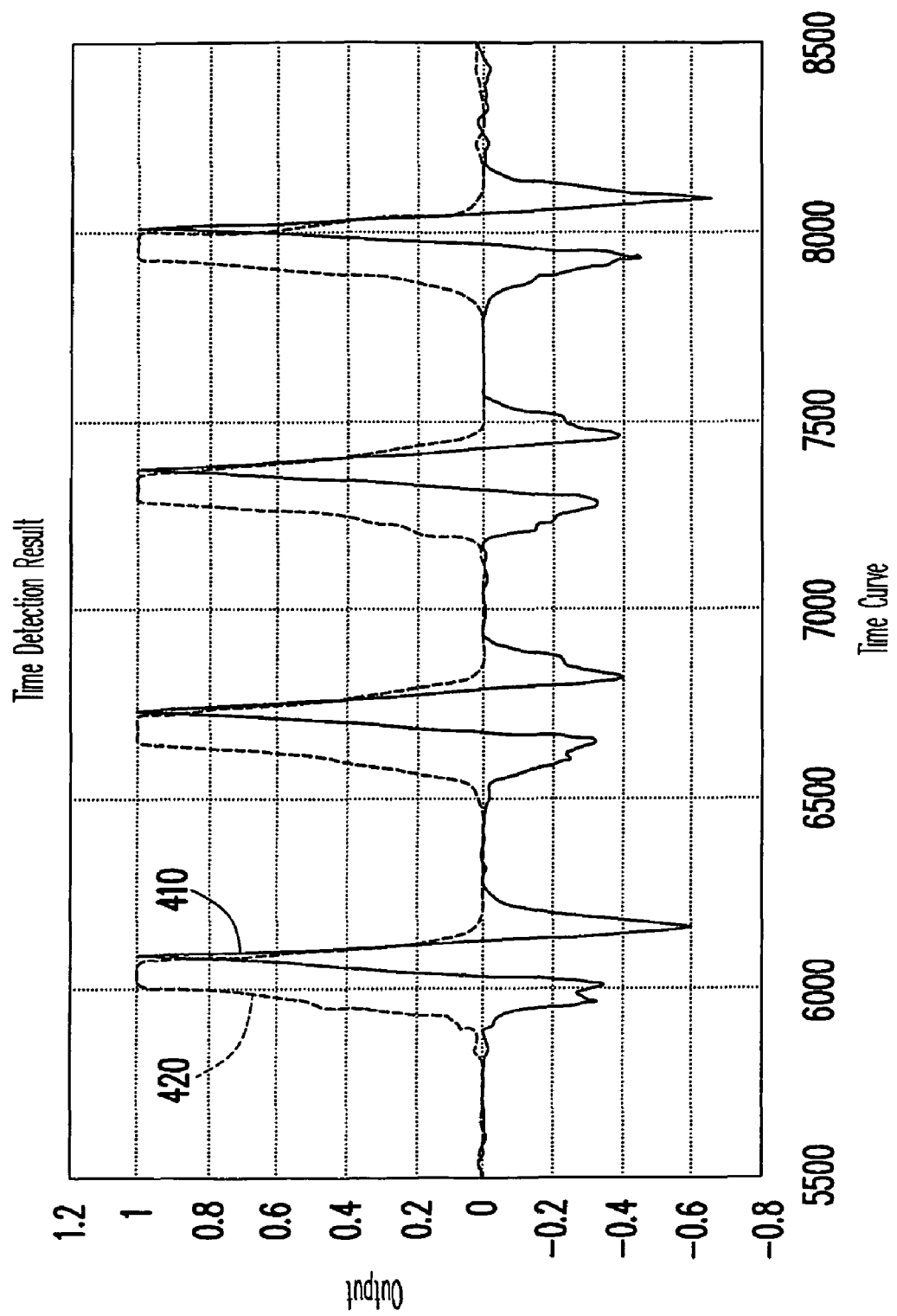
FIG. 4 is a schematic view of time detection results obtained in the present invention and results obtained through the conventional circuit.

FIG. 4 is a schematic view of time detection simulation results obtained in the present invention and results obtained through the conventional circuit. The time curve obtained through the method for detecting a synchronization signal of the present invention is shown by the solid line 410, and the result obtained through the conventional method is shown by the dotted line 420. It may be clearly known that, the detection method provided by the present invention achieves significant improvements and effects in the plateau region and also has a high identification rate.

Figure 5A:
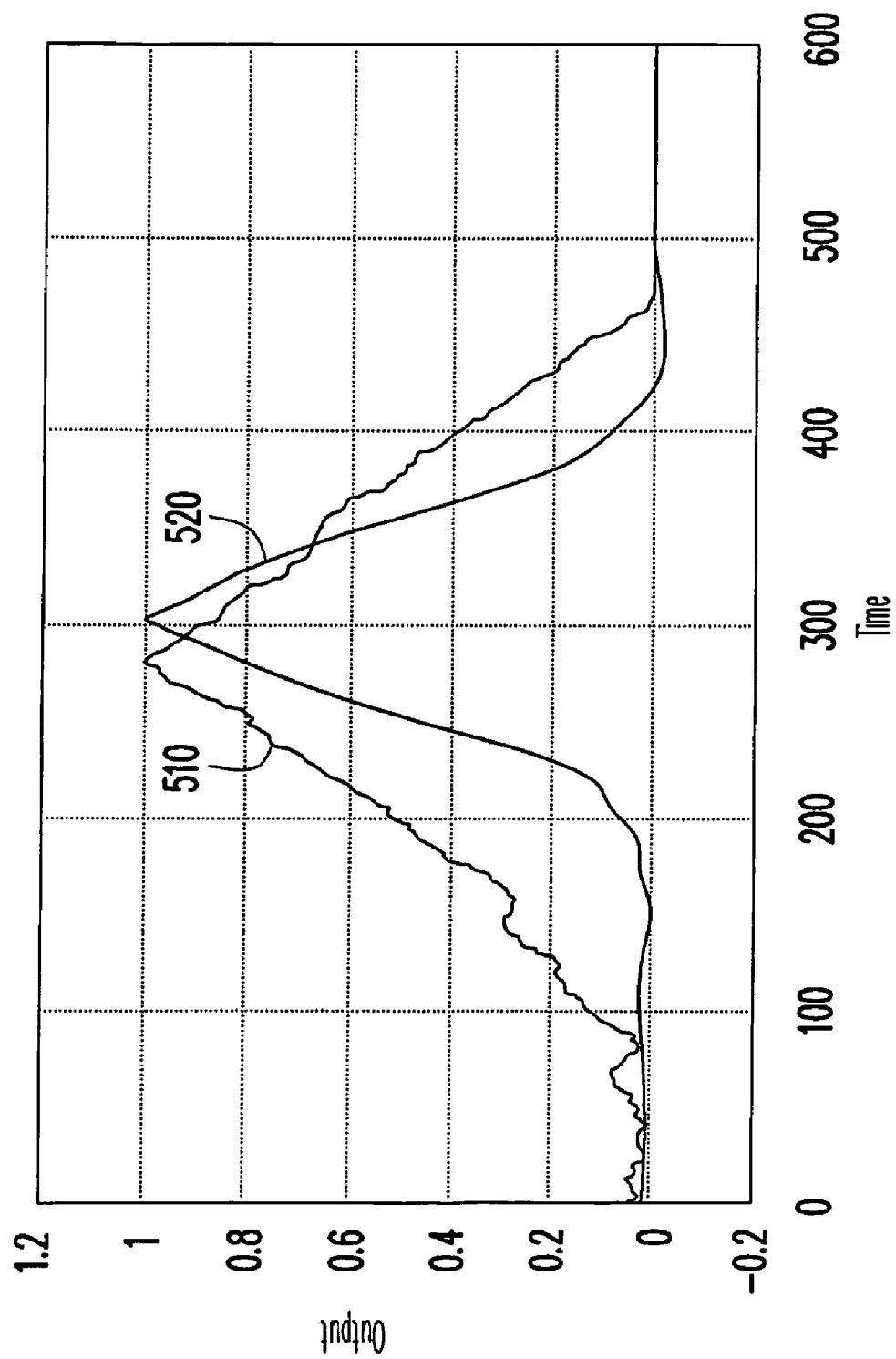
FIGS. 5A and 5B are comparison diagrams between the results obtained in U.S. Pat. No. 7,012,881 and that obtained through the method for detecting a synchronization signal in the present invention.
Figure 5B:
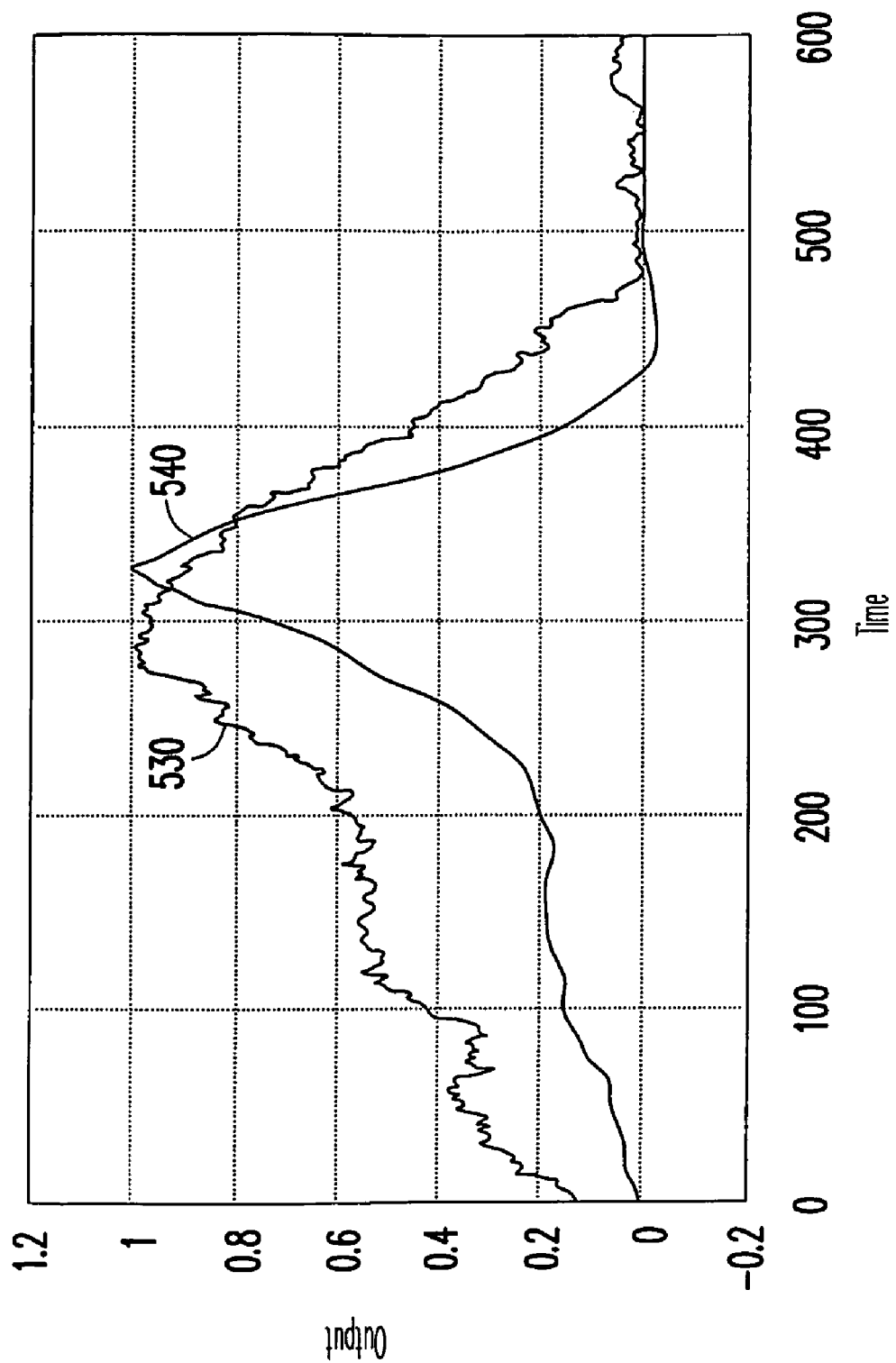

In FIGS. 5A and 5B, the U.S. Pat. No. 7,012,881, entitled "Timing and Frequency offset Estimation Scheme for OFDM Systems by using an Analytic Tone" is mainly compared with the present invention. FIG. 5A shows detection results obtained in U.S. Pat. No. 7,012,881 and that obtained through the method for detecting a synchronization signal of the present invention, which are respectively marked with 510 and 520, and meanwhile the peak positions may be further detected. In addition, referring to FIG. 5B, if the signal is transmitted in a typical urban channel (TU Channel), many noises are existed, and the results obtained by U.S. Pat. No. 7,012,881 and the results obtained by the present invention are respectively indicated by 530 and 540, i.e., non-difference is generated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for detecting a synchronization signal in a communication system, comprising:

receiving a received signal containing a synchronization signal, and sequentially generating a plurality of input signals by performing an auto-correlation computation;

sequentially obtaining a first window value, a second window value, and a third window value corresponding to the input signals according to a first window, a second window, and a third window, wherein the second window is larger than the first window and the third window;

determining whether a peak is generated due to receiving the synchronization signal in the auto-correlation computation according to the second window value; and obtaining a balance value from an absolute value of a difference between the first window value and the third window value, wherein the balance value is subtracted from the second window value to get an output signal of the detection method, and then a peak position of the output signal is identified and then compensated for a delay caused by a length of the third window, thereby obtaining a symbol edge of the synchronization signal.

2. The method for detecting a synchronization signal according to claim 1, wherein when compensating for the delay caused by the length of the third window, a compensated length is the length of the third window.

3. The method for detecting a synchronization signal according to claim 1, wherein a length of the second window is a length of a plateau generated by the synchronization signal after being performed with the auto-correlation computation.

4. The method for detecting a synchronization signal according to claim 1, wherein the first window value, the second window value, and the third window value are the number of registers respectively corresponding to the first window, the second window, and the third window.

5. The method for detecting a synchronization signal according to claim 1, wherein the first window value, the second window value, and the third window value corresponding to the input signals obtained according to the first window, the second window, and the third window are respectively calculated by summing up a first number, a second number, and a third number of input signal values.

6. The method for detecting a synchronization signal according to claim 5, wherein the first number and the third number are one quarter of the second number.

7. The method for detecting a synchronization signal according to claim 1, wherein the method is applicable for wireless local area network (WLAN), worldwide interoperability for microwave access (WiMAX), or wideband code division multiple access (WCDMA).

8. A device for detecting a synchronization signal in a communication system, comprising:

an auto-correlation generator, for receiving a plurality of synchronization signals, and sequentially generating a plurality of input signals by performing an auto-correlation computation;

a plurality of registers, connected serially, for sequentially receiving the input signals generated by the auto-correlation generator, and sequentially storing the input signals to the serially-connected registers by means of shifting; and a plurality of adders, for sequentially obtaining a first number, a second number, and a third number of input signal values stored in the serially-connected registers from an end of the serially-connected registers where the input signals are received, and summing up the values to get a first window value, a second window value, and a third window value, wherein the first number, the second number, and the third number are the number of the registers respectively corresponding to a first window, a second window, and a third window, the second number is larger than the first number and the third number, wherein it is determined according to the second window value whether a peak is generated due to receiving a synchronization signal by the auto-correlation generator, a balance value is obtained from an absolute value of a difference between the first window value and the third window value, and then the balance value is subtracted from the second window value to get an output signal of the detection device; and a peak position of the output signal is identified and then compensated for a delay caused by a length of the third window, thereby obtaining a symbol edge of the synchronization signal.

9. The device according to claim 8, wherein when compensating for the delay caused by the length of the third window, a compensated length is the length of the third window.

10. The device according to claim 8, wherein a length of the second window is a length of a plateau generated by the synchronization signal after passing through the auto-correlation generator.

11. The device according to claim 8, wherein the first number and the third number are one quarter of the second number.

12. The device according to claim 8, wherein the device is applicable for WLAN, WiMAX, or WCDMA.

* * * * *